United States Patent [19]
Goodrum et al.

[11] Patent Number: 5,579,512
[45] Date of Patent: Nov. 26, 1996

[54] SYSTEMPRO EMULATION IN A SYMMETRIC MULTIPROCESSING COMPUTER SYSTEM

[75] Inventors: Alan L. Goodrum; Gary W. Thome, both of Tomball, Tex.

[73] Assignee: Compaq Computer Corporation, Houston, Tex.

[21] Appl. No.: 366,466

[22] Filed: Dec. 30, 1994

[51] Int. Cl.$^6$ .................................................. G06F 13/00
[52] U.S. Cl. ......................... 395/500; 395/427; 395/800
[58] Field of Search ................................ 395/500, 425, 395/775

[56] References Cited

U.S. PATENT DOCUMENTS 5,353,415 10/1994 Wolford et al. ......................... 395/325
5,437,042 7/1995 Culley et al. ............................ 395/800

OTHER PUBLICATIONS

Portions of documentation for Systempro XL computer system, Compaq Computer Corp., date of publication unknown.

Primary Examiner—Jack B. Harvey
Assistant Examiner—John Travis
Attorney, Agent, or Firm—Pravel, Hewitt, Kimball & Krieger

[57] ABSTRACT

Computer systems which emulate the operation of the Systempro and the Systempro registers, even though they are symmetric multiprocessors developed using the Intel P54C and P54CM or their equivalents. Further, the APICs in the systems are configured to emulate the interrupt handling of the Systempro. The FLUSH and CACHEON bits are emulated by flushing both processors and an external cache upon setting of the FLUSH bit or toggling of the CACHEON bit if the processors are the P54C and P54CM in a dual processor configuration. If the processors include separate level 2 caches, the CACHEON bit controls the enablement of the caches and the FLUSH bit causes a flushing of the caches for the respective processor. The SLEEP bit for the second processor is emulated by providing an initialization IPI to the second processor APIC without providing a startup IPI, and the RESET register bit is ignored.

4 Claims, 15 Drawing Sheets

Figure 3A

| ADDRESS | NAME | BIT | r/w | DESCRIPTION |
|---|---|---|---|---|
| 0020h, 0021h, 00a0h, 00a1h for P2 only | P2 8259 Interrupt Controller | 0-7 | r/w | P2 8259 Interrupt Controller<br>Always reads 00.<br>Writes cause no operation |
| 00F0h | Math Coprocessor Error/Cold boot | 7-0 | w | Clear NCP error<br>Always write 1's. Any write to this register clears NCP error and sets bit 7 in read register. |
| | | 7 | r | Boot<br>1 = warm boot, set when any value is written to this register<br>0 = cold boot, this register has not been written |
| | | 6-0 | r | Reserved. Always reads 1's. |
| 0C67h | P1 Cache Control Port | 7 | r/w | NCA RAM Programming |
| | | 6 | r/w | NCA RAM Data |
| | | 5-2 | ro | reserved |
| | | 1 | r/w | LKMOD<br>0 = 386 default lock mechanism<br>1 = modified lock mechanism |
| | | 0 | r/w | LKINH<br>0 = allow 386 CPU lock to cache controller<br>1 = inhibit 386 CPU lock to cache controller |
| 0C6Ah | P1 Processor Control Port | 7 | r/w | INTDIS<br>0 = do not disable PINT<br>1 = P1 PINT disable |
| | | 6 | r/w | PINT<br>Write 0 = no operation<br>Write 1 = causes IRQ13 interrupt to P1 (must be cleared by interrupt handler)<br>Read 0 = no processor interrupt present<br>Read 1 = processor communication interrupt present |

Figure 3B

| | | | | |
|---|---|---|---|---|
| | | 5 | ro | NCPERR<br>0 = no NCP error<br>1 = NCP error present (must be cleared by interrupt handler)<br>Writes are ignored. |
| | | 4 | r/w | FLUSH<br>Always reads 0<br>Write 0 = no operation<br>Write 1 = flush P1 caches |
| | | 3 | ro | Always reads 0 |
| | | 2 | r/w | CACHEON<br>Disable P1 caches. |
| | | 1 | ro | NCPIN<br>Reflects presence of NCP. |
| | | 0 | ro | Always read 0 |
| 0C6Bh | EISA Arbitration Inhibit | 7-0 | r/w | Clocks to inhibit EISA bus arbitration request |
| 0C70h | Who Am I | 7-0 | ro | Who Am I<br>00h = P1<br>F0h = P2 |
| FC67h | P2 Cache Control Port | 7 | r/w | NCA RAM Programming |
| | | 6 | r/w | NCA RAM Data |
| | | 5-2 | ro | reserved |
| | | 1 | r/w | LKMOD<br>0 = 386 default lock mechanism<br>1 = modified lock mechanism |
| | | 0 | r/w | LKINH<br>0 = allow 386 CPU lock to cache controller<br>1 = inhibit 386 CPU lock to cache controller |
| FC68h | P2 Interrupt Vector Port | 7-0 | r/w | P2 interrupt vector bits 7-0 |
| FC6Ah | P2 Processor Control Port | 7 | r/w | INTDIS<br>0 = do not disable PINT<br>1 = P2 PINT disable |

Figure 3C

| | | 6 | r/w | PINT<br>Write 0 = no operation<br>Write 1 = causes P2 INTR (must be cleared by interrupt handler)<br>Read 0 = no processor interrupt present<br>Read 1 = Processor communication interrupt present |
|---|---|---|---|---|
| | | 5 | ro | NCPERR<br>0 = no NCP error<br>1 = NCP error present (must be cleared by interrupt handler) |
| | | 4 | r/w | FLUSH<br>Always reads 0.<br>Write 0 = no operation<br>Write 1 = flush P2 caches. |
| | | 3 | ro | SLEEP<br>0 = Enable CPU2 to execute<br>1 = Disable P2 from executing |
| | | 2 | r/w | CACHEON<br>Disable P2 caches |
| | | 1 | ro | NCPIN<br>Reflects presence of NCP. |
| | | 0 | w | RESET CPU<br>Always reads 0. |

Figure 4A

| ADDRESS | NAME | BIT | r/w | DESCRIPTION |
|---|---|---|---|---|
| 0020h, 0021h, 00A0h, 00A1h for P2 only | P2 8259 Interrupt Controller | 0-7 | r/w | P2 8259 Interrupt Controller<br>Always reads 00.<br>Writes cause no operation |
| 00F0h | Math Coprocessor Error/Cold boot | 7-0 | w | Clear NCP error<br>Always write 1's. Any write to this register clears NCP error and sets bit 7 in read register. |
| | | 7 | r | Boot<br>1 = warm boot, set when any value is written to this register<br>0 = cold boot, this register has not been written |
| | | 6-0 | r | Reserved. Always reads 1's. |
| 0C67h | P1 Cache Control Port | 7-0 | ro | Always reads 0's. |
| 0C6Ah | P1 Processor Control Port | 7 | r/w | INTDIS<br>0 = do not disable PINT<br>1 = P1 PINT disable |
| | | 6 | r/w | PINT<br>Write 0 = no operation<br>Write 1 = causes IRQ13 interrupt to P1 (must be cleared by interrupt handler)<br>Read 0 = no processor interrupt present<br>Read 1 = processor communication interrupt present |
| | | 5 | ro | NCPERR<br>0 = no NCP error<br>1 = NCP error present (must be cleared by interrupt handler) |
| | | 4 | r/w | FLUSH<br>Always reads 0<br>Write 0 = no operation<br>Write 1 = flush P1 and P2 internal caches and L2. |

Figure 4B

| | | 3 | ro | SLEEP (not used for P1)<br>Always reads 0 |
|---|---|---|---|---|
| | | 2 | r/w | CACHEON<br>Flush P1 and P2 internal caches and L2 when toggled. |
| | | 1 | ro | NCPIN<br>Always reads 1 to indicate P54C has internal NCP. |
| | | 0 | ro | RESET CPU (not used for P1)<br>Always read 0 |
| 0C6Bh | CPU Case Register | 7 | ro | Hot Spare Boot<br>0 = normal boot<br>1 = P54C is dead. Booted on P54CM |
| | | 6-4 | r/wo | 000 single CPU<br>010 P54CT present<br>100 P54CM present<br>110 reserved<br>001 dual P54C without APIC<br>011 dual P54C with APIC<br>101 reserved<br>111 reserved |
| | | 3-0 | r/wo | I/O APIC number. Bits 3-0 of this register are used in the APIC I/O Register Select and Window Register address decode bits 15-12 respectively. Only the first write to this register will allow these bits to be modified. |
| 0C70h | Who Am I | 7-0 | ro | Who Am I<br>00h = P1<br>F0h = P2 |
| FC67h | P2 Cache Control Port | 7-0 | ro | Always reads 0's. |
| FC68h | P2 Interrupt Vector Port | 7-0 | r/w | P2 interrupt vector bits 7-0 |
| FC6Ah | P2 Processor Control Port | 7 | r/w | INTDIS<br>0 = do not disable PINT<br>1 = P2 PINT disable |

Figure 4C

| | 6 | r/w | PINT<br>Write 0 = no operation<br>Write 1 = causes P2 INTR (must be cleared by interrupt handler)<br>Read 0 = no processor interrupt present<br>Read 1 = Processor communication interrupt present |
|---|---|---|---|
| | 5 | ro | NCPERR<br>0 = no NCP error<br>1 = NCP error present (must be cleared by interrupt handler) |
| | 4 | r/w | FLUSH<br>Always reads 0.<br>Write 0 = no operation<br>Write 1 = flush P1 and P2 internal caches and L2. |
| | 3 | ro | SLEEP<br>0 = Enable CPU2 to execute<br>1 = Reset P2 and disable it from executing |
| | 2 | r/w | CACHEON<br>Flush P1 and P2 internal caches and L2 when toggled. |
| | 1 | ro | NCPIN<br>Always reads 1 to indicate P54CM has internal NCP. |
| | 0 | ro | RESET CPU<br>Always reads 0. |

Figure 5A

| ADDRESS | NAME | BIT | r/w | DESCRIPTION |
|---|---|---|---|---|
| 0020h, 0021h, 00A0h, 00A1h for P2 only | P2 8259 Interrupt Controller | 0-7 | r/w | P2 8259 Interrupt Controller Always reads 00. Writes cause no operation |
| 00F0h | Math Coprocessor Error/Cold boot | 7-0 | w | Clear NCP error Always write 1's. Any write to this register clears NCP error and sets bit 7 in read register. |
| | | 7 | r | Boot 1 = warm boot, set when any value is written to this register 0 = cold boot, this register has not been written |
| | | 6-0 | r | Reserved. Always reads 1's. |
| 0C67h | P1 Cache Control Port | 7-0 | ro | Always reads 0's. |
| 0C6Ah | P1 Processor Control Port | 7 | r/w | INTDIS 0 = do not disable PINT 1 = P1 PINT disable |
| | | 6 | r/w | PINT Write 0 = no operation Write 1 = causes IRQ13 interrupt to P1 (must be cleared by interrupt handler) Read 0 = no processor interrupt present Read 1 = processor communication interrupt present |
| | | 5 | ro | NCPERR 0 = no NCP error 1 = NCP error present (must be cleared by interrupt handler) |
| | | 4 | ro | FLUSH Always reads 0 |
| | | 3 | ro | SLEEP (not used for P1) Always reads 0 |

Figure 5B

| | | 2 | r/w | CACHEON<br>0 = Assert FLUSH to P1 internal and L2 caches<br>1 = Enable caches |
|---|---|---|---|---|
| | | 1 | ro | NCPIN<br>Always reads 1 to indicate P54C has internal NCP. |
| | | 0 | ro | RESET CPU (not used for P1)<br>Always read 0 |
| 0C6Bh | CPU Case Register | 7 | ro | Hot Spare Boot<br>0 = normal boot<br>1 = P54C is dead. Booted on P54CM |
| | | 6-4 | r/wo | 000 single CPU<br>010 P54CT present<br>100 P54CM present<br>110 reserved<br>001 dual P54C without APIC<br>011 dual P54C with APIC<br>101 reserved<br>111 reserved |
| | | 3-0 | r/wo | I/O APIC number. Bits 3-0 of this register are used in the APIC I/O Register Select and Window Register address decode bits 15-12 respectively. Only the first write to this register will allow these bits to be modified. |
| 0C70h | Who Am I | 7-0 | ro | Who Am I<br>00h = P1<br>F0h = P2 |
| FC67h | P2 Cache Control Port | 7-0 | ro | Always reads 0's. |
| FC68h | P2 Interrupt Vector Port | 7-0 | r/w | P2 interrupt vector bits 7-0 |
| FC6Ah | P2 Processor Control Port | 7 | r/w | INTDIS<br>0 = do not disable PINT<br>1 = P2 PINT disable |

Figure 5C

| | | | |
|---|---|---|---|
| | 6 | r/w | PINT<br>Write 0 = no operation<br>Write 1 = causes P2 INTR (must be cleared by interrupt handler)<br>Read 0 = no processor interrupt present<br>Read 1 = Processor communication interrupt present |
| | 5 | ro | NCPERR<br>Always Reads 0 |
| | 4 | ro | FLUSH<br>Always reads 0. |
| | 3 | ro | SLEEP<br>0 = Enable CPU2 to execute<br>1 = Reset P2 and disable it from executing for P54C with APIC<br>1 = Disable P2 from executing for P54C without APIC |
| | 2 | r/w | CACHEON<br>0 = Assert FLUSH to P2 internal and L2 caches.<br>1 = Enable caches. |
| | 1 | ro | NCPIN<br>Always reads 1 to indicate P54CM has internal NCP. |
| | 0 | ro | RESET CPU<br>1 = Pulse PRESETOUT[2] pin for 15 PCLKS for P54C without APIC case, else ignore writes.<br>Always reads 0. |

SYSTEMPRO EMULATION IN A SYMMETRIC MULTIPROCESSING COMPUTER SYSTEM

BACKGROUND OF THE INVENTION

1. Field of the Invention

The invention relates to multiprocessor computer systems, and more particularly, to a symmetric multiprocessor computer system which emulates an asymmetric multiprocessor computer system.

2. Description of the Related Art

Microprocessors have seen rapid improvements in speed and performance. For example, the latest generation of microprocessors from Intel Corporation include the Pentium processors, which contain significant enhancements over the prior generation 486 processors. Even with the rapid improvements in microprocessor performance, however, resource requirements of software applications are always increasing, which in turn drives the need for the design and development of ever more powerful and efficient computer systems.

One well known method of improving computer performance is to provide multiple processors in a single system. Both asymmetrical and symmetrical multiprocessor systems have been developed. In asymmetrical multiprocessor systems, one microprocessor is the master and another microprocessor performs specific functions as a slave of the master microprocessor. In this configuration, the slave processor performs only operations designated by the master processor.

The symmetrical multiprocessor system is more efficient then the asymmetrical system, as tasks are more evenly divided between the processors. Thus, in a symmetrical system, any processor can perform any required function. Thus, all microprocessors operate simultaneously, spending little or no idle time, and the computer system operates near its maximum efficiency. However, although symmetrical multiprocessor systems are efficient, they are also very difficult to design, thereby adding to their cost and complexity. As a result, only very high end users can afford symmetrical multiprocessing systems.

To alleviate design complexities of multiprocessor systems, Intel has developed the Pentium P54C and P54CM processors. The P54C and P54CM processors integrate logic necessary for a dual processor system, each including an on-chip advanced programmable interrupt controller (APIC). The local APICs support multiprocessor interrupt management, multiple I/O subsystem support, compatibility with the EISA 8259 interrupt controllers, and interprocessor interrupts between the two processors.

The APIC is a standardized approach developed by Intel for symmetric multiprocessing. It allows any interrupt to be serviced by any CPU. The APIC architecture is implemented in two pieces: an "I/O APIC" resides close to the I/O subsystem and a "local APIC" is implemented inside the P54C or P54CM processors. The I/O APIC contains edge/level and input polarity logic, and tables to allow individual interrupts to be addressed to one or more CPUs at various interrupt priorities. The local APIC is implemented inside each of the P54C or P54CM processors and receives interrupt messages from the I/O APIC and keeps track of which interrupts are in service by each CPU. The local APICs are also responsible for sending special interprocessor interrupt (IPI) messages over an APIC bus to the other CPU to accomplish special functions. Thus, on a dual processor board utilizing a P54C processor and a P54CM processor, the two processors can be directly connected to the processor bus without the need for additional logic. This highly integrated solution greatly simplifies the design of dual processor systems.

While symmetric multiprocessors offer great advantages, one problem that currently exists is a relative lack of software to utilize the fully symmetric nature. The first multiprocessor personal computer was the Compaq Systempro, introduced in November 1989. The Systempro was an asymmetric multiprocessor, where the first or primary processor, referred to as P1, handled all of the system interrupts, with the secondary processor P2 only receiving numeric coprocessor error interrupts and interprocessor interrupts. The Systempro included a series of processor and interprocessor communication registers, to control operation of each processor and to allow communication between the processors. Because it was the first multiprocessing personal computer, and other multiprocessing personal computers did not appear for many years, such as the middle to end of 1992, a large amount of software was developed for the Systempro, its asymmetric nature and its specific register configuration.

Today symmetric multiprocessors are readily available, but as noted, there is a lack of software to use the multiprocessing nature. Much of the multiprocessing software available is Systempro software, but the symmetric versus asymmetric natures and register differences very much limit the use of the Systempro software. Therefore it is desirable to allow a symmetric multiprocessing system, especially one developed with the P54C and P54CM and APICs, to emulate the Systempro to allow use of a large amount of existing software.

SUMMARY OF THE PRESENT INVENTION

Computer systems according to the present invention emulate the operation of the Systempro and the Systempro registers as configured on November 1989 as shown in FIGS. 3A–3C, even though they are symmetric multiprocessors developed using the Intel P54C and P54CM or their equivalents. Further, the APICs in the systems are configured to emulate the interrupt handling of the Systempro.

The emulation is as close as possible, given that the Systempro was based on 80386 technology, including the 82385 cache controller, and numerous items have changed, particularly in the cache controller area, as the P54 class processor includes internal caches which operate differently than the 82385. Nonetheless, the great majority of the Systempro software will execute on computer systems according to the present invention. Specific details as to particular registers and features are provided in the detailed description.

BRIEF DESCRIPTION OF THE DRAWINGS

A better understanding of the present invention can be obtained when the following detailed description of the preferred embodiment is considered in conjunction with the following drawings, in which:

FIGS. 3A, 3B and 3C are a table specifying the Systempro registers as configured on November 1989 and result of operations to those registers;

FIGS. 4A, 4B and 4C are a table specifying emulation of the Systempro registers and the result of operations to the emulated registers for the processor board of FIG. 2;

FIGS. 5A, 5B and 5C are a table specifying emulation of the Systempro registers and the result of operations to the emulated registers for the processor board of FIG. 2A.

DETAILED DESCRIPTION OF THE PREFERRED EMBODIMENT

Figure 1:
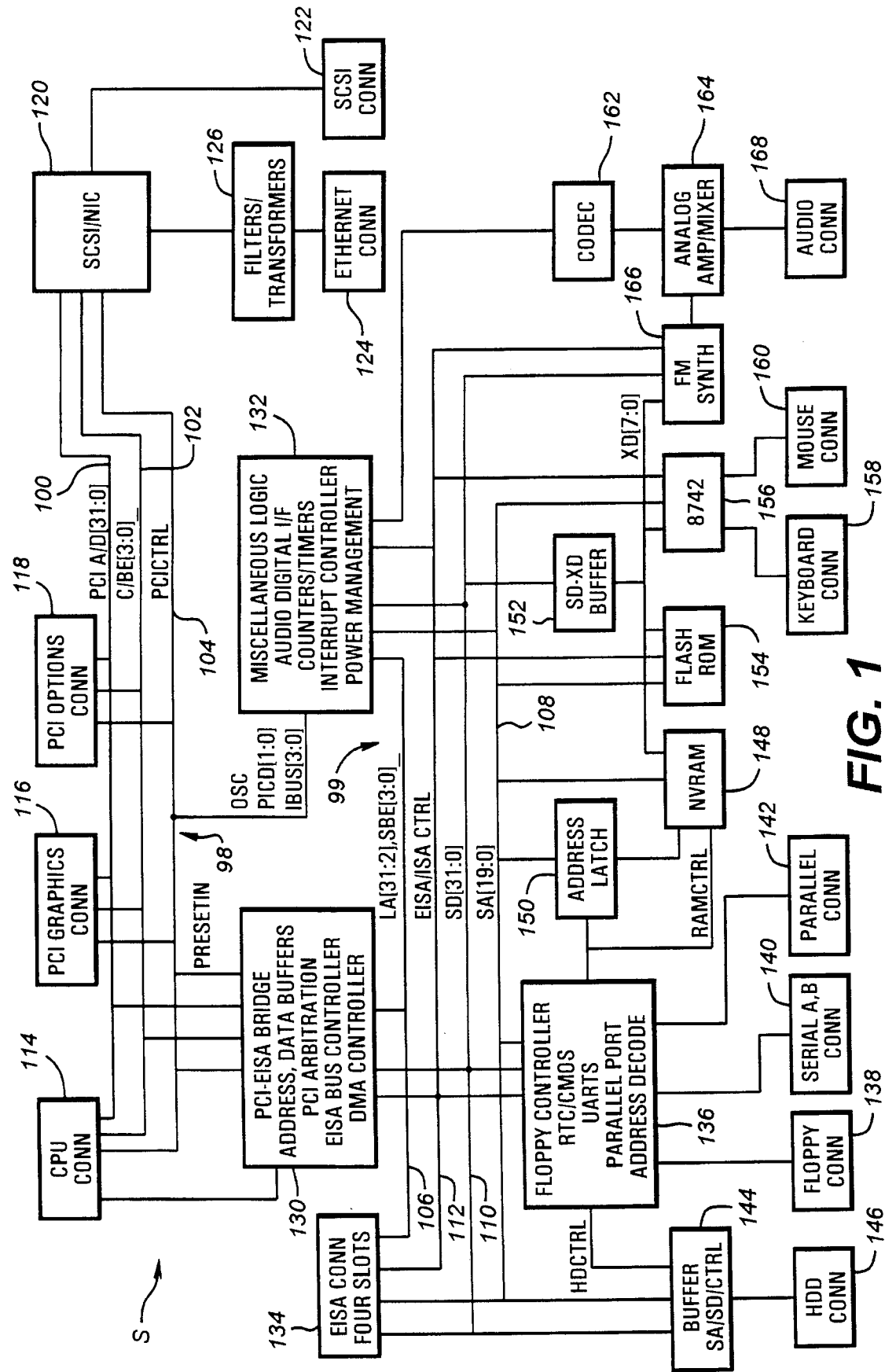
FIG. 1 is a block diagram of a system board for use with the preferred embodiment of the present invention.
Figure 2:
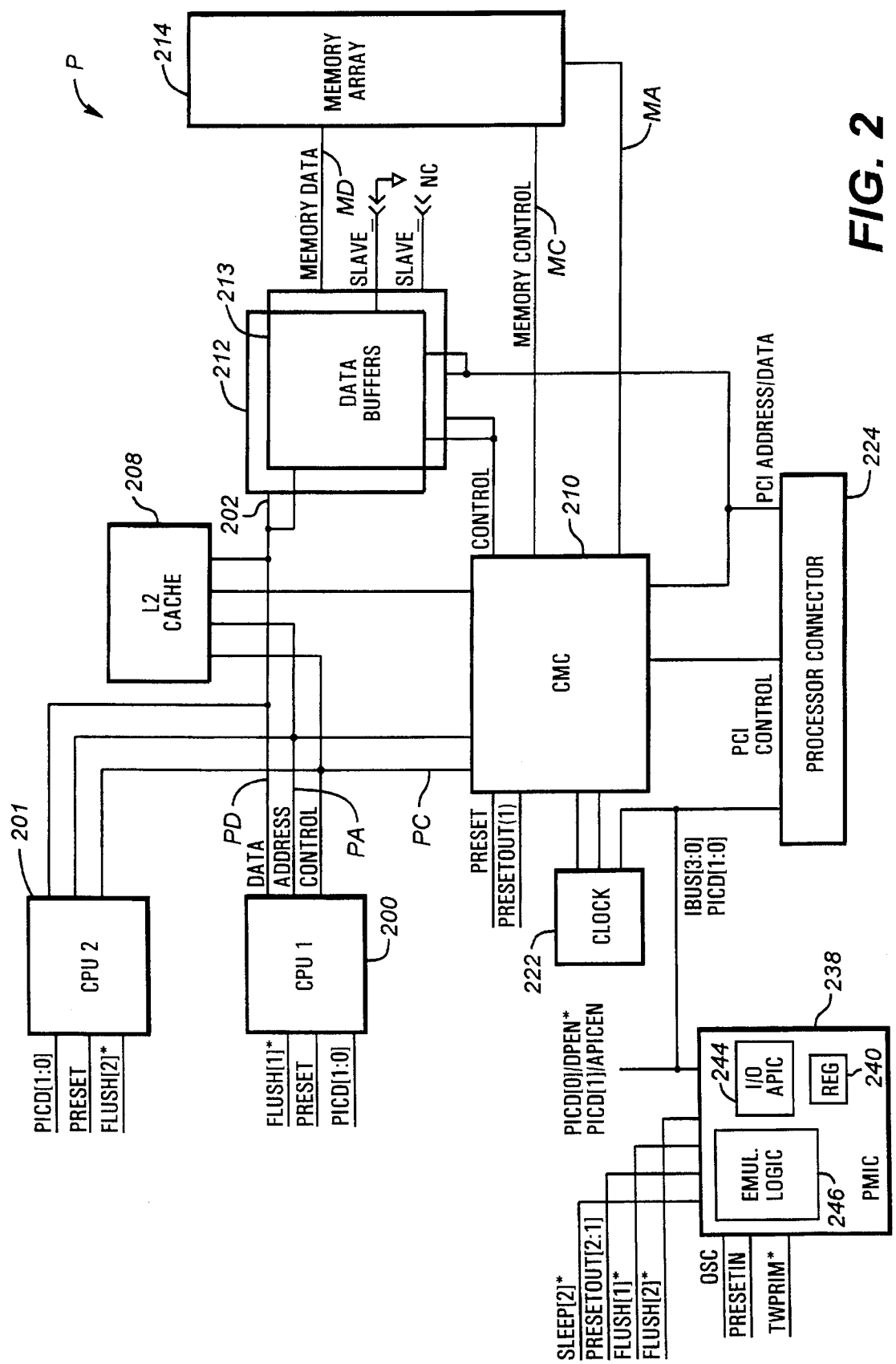
FIG. 2 is a block diagram of a processor board including multiple processors and Systempro emulation according to the present invention.

Referring now to FIG. 1, the system board S of an exemplary multiprocessor computer system incorporating the preferred embodiment of the present invention is shown. In the preferred embodiment, the system board S contains circuitry and slots for receiving interchangeable circuit boards, including a processor board P as shown in FIG. 2. The system board S also includes two primary buses. The first bus is the PCI or Peripheral Component Interconnect bus 98 which includes address/data portion 100, also referred to as PCIAD, control and byte enable portion 102 and control signal portion 104. The control signal portion 104 includes a clock PCICLK preferably running at 33 MHz. The PCICLK clock is provided by the processor board P and is the main PCI bus clock. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

A CPU connector 114 is connected to the PCI bus 98 to receive the processor board P having two microprocessors. A PCI graphics connector 116 is connected to the PCI bus 98 to receive a video graphics card (not shown). The graphics card provides video signals to an external monitor (not shown). A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems, and a DMA controller. Preferably the PCI-EISA bridge 130 is a single integrated circuit, but other combinations are possible. During power up, the PCI-EISA bridge 130 asserts the signal PRESETIN to reset the processor board P.

A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry. The interrupt controller portion of the miscellaneous system logic chip 132 transmits interrupt signals to the microprocessor on the processor board P via signals IBUS[3:0]. As there are 24 interrupts in the PCI/EISA system, the interrupts are transmitted 4 at a time across IBUS[3:0] in 6 OSC clocks. The OSC clock is provided by logic on the processor board P, and preferably has a frequency of approximately 14.3 MHz. In an alternative embodiment, the miscellaneous logic chip 132 is implemented with the 82374EB EISA System Component (ESC) chip from Intel, while the PCI-EISA bridge 130 is the 82375EB PCI-EISA Bridge (PCEB) chip from Intel. The ESC includes an I/O advanced programmable interrupt controller (APIC) so that it can communicate interrupts directly to the processors located on the processor board P over APIC data bits PICD[1:0]. Table 1 indicates the mapping of the EISA system and PCI interrupts for the two alternatives. If the ESC is utilized, the ESC handles all EISA system interrupts using its I/O APIC and the PCI interrupts are handled separately using the I/O APIC in a PCI multiprocessor interrupt chip (PMIC) 238 (FIGS. 2 and 2A) located on the processor boards. If the miscellaneous system logic chip 132 is utilized, the PCI interrupts are mapped to EISA system interrupts, and all interrupts are handled using the PMIC I/O APIC.

TABLE 1

| APIC INPUT | Misc. System Logic Chip 132 EISA/PCI Interrupts | ESC & PMIC 238 Device/Slot |
|---|---|---|
| INTI0 | INTR | System 8259 INTR output from ESC for EISA devices |
| INTI1 | IRQ1 | NIC 120 |
| INTI2 | IRQ0 | SCSI 120 |
| INTI3 | IRQ3 | PCI slot 1 int CD |
| INTI4 | IRQ4 | PCI slot 2 int AB |
| INTI5 | IRQ5 | PCI slot 2 int CD |
| INTI6 | IRQ6 | PCI slot 3 int CD |
| INTI7 | IRQ7 | PCI slot 3 int CD |
| INTI8 | IRQ8 | |
| INTI9 | IRQ9 | |
| INTI10 | IRQ10 | |
| INTI11 | IRQ11 | |
| INTI12 | IRQ12 | |
| INTI13 | DMA chain | PCI slot 1 int AB |
| INTI14 | IRQ14 | |
| INTI15 | IRQ15 | |
| INTI16 | PCIRQ0A | |
| INTI17 | PCIRQ0B | |
| INTI18 | PCIRQ0C | |
| INTI19 | PCIRQ0D | |
| INTI20 | PCIRQ1AC | |
| INTI21 | PCIRQ1BD | |
| INTI22 | PCIRQ2AC | |
| INTI23 | PCIRQ2BD | |
| INTI24 | P1 NCP Error, P1 PINT | |

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. The BIOS contains the instructions for performing power on functions. One of the microprocessors on the processor board is designated as the primary processor for running the BIOS code. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

It is understood that this is an exemplary embodiment of a computer system. Many alternative embodiments could exist. For example, there would be additional PCI and EISA slots if the computer system was intended for file server use, with the video system then preferably connected off of the EISA bus 99 and the audio system components removed. Other variations will be apparent to one skilled in the art.

Referring now to FIG. 2, the processor board P for use with the system board S is shown. In the processor board P, the primary CPU or microprocessor 200 is preferably the 64-bit Pentium P54C processor from Intel, which operates at 50 or 60 MHz externally and 75 or 90 MHz internally. The microprocessor 200 is connected to a processor bus 202 having data, address and control portions PD, PA and PC. A second microprocessor 201, preferably the Pentium P54CM from Intel, is also connected to the processor bus 202. Each of the Pentium P54C and P54CM processors includes an on-chip advanced programmable interrupt controller (APIC). The local APICs support multiprocessor interrupt management as well as perform interprocessor interrupts (IPIs) for communication with each other. The local APICs work in conjunction with an I/O APIC 244 located externally on a PCI multiprocessor interface chip (PMIC) 238. If the miscellaneous logic chip 132 is implemented with the ESC, then a portion of the I/O APIC is located on the ESC. In addition to the I/O APIC 244, the PMIC 238 also includes emulation logic 246 and a CPU case register 240, which will be described below.

The CPU 200 (or logical CPU1) is preferably configured as the primary processor responsible for booting up the system. In normal operation, after the PCI-EISA bridge 130 has negated PRESETIN low, CPU1 vectors to an entry point in the flash ROM 154 to execute the BIOS code. In addition to properly initializing various system components, CPU1 also awakens the second processor 201 (logical CPU2) to place it in operation. To start the P54CM processor, CPU1 transmits a startup IPI message to CPU2.

The I/O APIC 244 in the PMIC 238 receives PCI and EISA interrupts through signals IBUS[3:0]. In response, the I/O APIC forwards the interrupts to the local APICs in the microprocessors 200 and 201 over the APIC bus PICD[1:0] as appropriate. The PMIC 238 also provides reset signals PRESETOUT[2:1]. In the P54C/CM dual processor configuration, the signal PRESETOUT[1] is provided to a processor cache and memory controller (CMC) and PCI bridge 210. In response to the signal PRESETOUT[1], the CMC 210 asserts a hard reset signal PRESET to both CPU1 and CPU2. The signal PRESETOUT[2] is unused in this configuration. Ordinarily, both signals PRESETOUT[2:1] follow the state of the system reset signal PRESETIN delayed by one PCICLK clock.

Additionally, the PMIC 238 provides the FLUSH[2:1]* signals to processors 200 and 201 to allow the internal or L1 caches to be flushed. The CMC 210 detects a flush acknowledge cycle from processor 200 and flushes the L2 cache 208 in response. Development of the FLUSH[2:1]* for these purposes is described below.

Each of the microprocessors 200 and 201 include an internal or L1 cache memory. A level 2 (L2) or external cache memory system 208 is connected to the processor bus 202 to provide additional caching capabilities to improve performance of the computer system. The CMC 210 is connected to the control portion PC and to the address portion PA. For the P54C/CM configuration, a single L2 cache is used for both microprocessors 200 and 201. In the two primary processor configuration, each processor is coupled to a separate L2 cache through the separate processor buses.

A set of two data buffers 212 and 213, which are preferably implemented with ASICs, are connected between the processor data bus PD and the 64-bit memory data bus MD provided by a memory array 214. Control signals to the data buffers 212 and 213 are provided by the CMC 210. The data buffers 212 and 213 are also connected to the PCI address and data bus PCIAD through a connector 224, which is provided to be mateably received by the processor connector 114.

The data buffers 212 and 213 each include a SLAVE_input. As shown, the SLAVE_input to the data buffer 212 is tied to ground and the SLAVE_input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

Clock distribution and generation circuitry 222 is associated with the processor card P and is connected to the CMC 210. The clock distribution circuitry 222 provides a clock PCLK to the processor bus 202, as well as the clock OSC for running a dead man counter 242 in the hot spare boot circuit 246 and for clocking transfers over the bus IBUS[3:0]. The processor connector 224 is connected to the CMC 210 and the clock distribution circuitry 222 to provide clocks (including PCICLK) to the computer system and to provide a PCI interface to allow the microprocessors 200 and 201 to access the PCI and EISA buses 98 and 99 and to allow PCI and EISA bus masters to access the main memory array 214. The PCI address and data are multiplexed on the bus PCIAD, with the address provided during the address phase and data provided during the data phase.

Figure 2A:
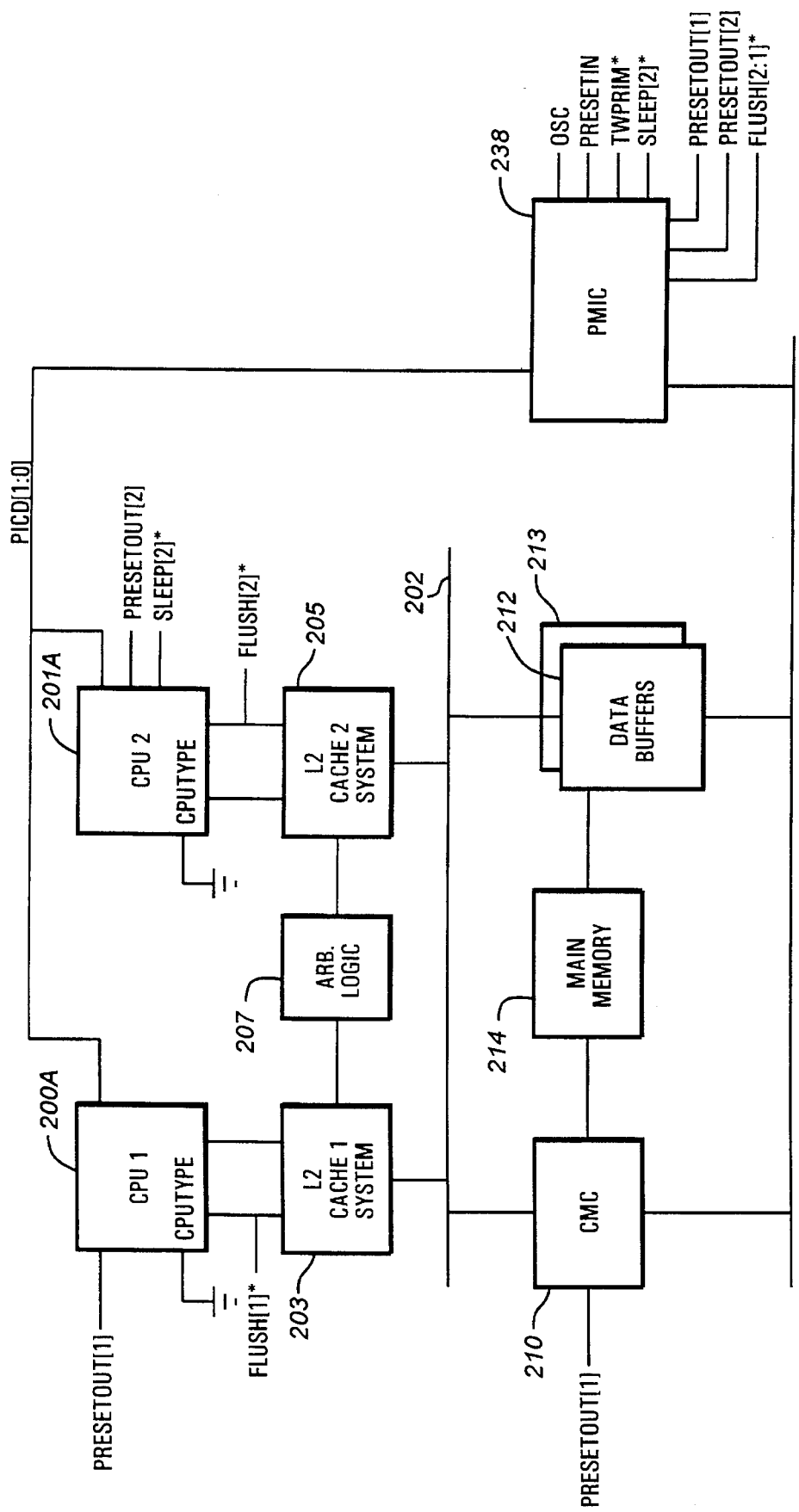
FIG. 2A is a block diagram of an alternative processor board including multiple processors and Systempro emulation according to the present invention.

In an alternative multiprocessor configuration, two Pentium P54C processors (each including a local APIC) are used instead of the P54C/CM configuration. This configuration will be referred to as the two primary processor configuration and is shown in FIG. 2A. Unlike the P54C/CM configuration, where both processors share all the processor signals, each of the processors in the two primary processor configuration is connected to a separate processor bus. With the processors thus separated, there is no contention for a single processor bus, as does exist in the P54C/CM configuration.

Referring now to FIG. 2A, the CPU1 200A and CPU2 201A are each connected to respective L2 cache systems 203 and 205, with arbitration logic 207 connected to each cache system 203, 205. The cache systems 203, 205 are connected to the processor bus 202, with a CMC 210, data buffers 212 and 213 and memory 214 configured as in the processor board of FIG. 2. It is noted that the CPUTYPE pins of CPU1 200A and CPU2 201A are grounded so that both appear as primary or P54C-type processors.

A PMIC 238 is also located on the processor board of FIG. 2A. The signals PICD[1:0] are connected to CPU1 200A, CPU2 201A and the PMIC 238. The signal PRESETOUT[1] is connected to CPU1 200A, while the signal PRESETOUT [2] is connected to CPU2 201A. The FLUSH[2:1]* signals are connected to the L2 cache systems 203 and 205 as well as to the processors 200A and 201A.

A variation of the two primary processor configuration involves use of processors without local APICs. In this alternative configuration, additional external logic on the processor board P must be implemented to allow CPU1 and CPU2 to communicate with each other and to handle interrupts. In both the two primary processor configurations, the PMIC 238 provides PRESETOUT[1] to CPU1 200A and PRESETOUT[2] to CPU2 201A as hard resets. After the PCI-EISA bridge 130 negates the system reset signal PRESETIN, CPU1 200A acts as the power on processor while CPU2 201A is maintained disabled through the use of a signal SLEEP[2]*. The signal SLEEP[2]* is controlled by a sleep bit in a CPU2 control register located in the PMIC 238. If the sleep bit is set high, then the signal SLEEP[2]* is asserted low. However, if the sleep bit is set low, then the signal SLEEP[2]* is deasserted high.

For the two primary processor with APIC configuration, CPU1 200A awakens CPU2 201A by first clearing the sleep bit in the CPU2 control register and then transmitting a startup IPI message. For the two primary processor without APIC configuration, a reset bit in the CPU2 control register is first set high before the sleep bit is cleared by CPU1. Writing a "1" to the reset bit causes the reset signal PRESETOUT[2] to be pulsed high for 15 PCICLK clocks. When both the signals SLEEP[2]* and PRESETOUT[2] are deasserted, CPU2 201A is awakened.

Bits 4, 5 and 6 of the CPU case register 240 (referred to as CPU_CASE[6:4]) in the PMIC 238 indicate the type of CPU configuration. If bits CPU_CASE[6:4] contain a value 0b000, then that indicates there is only one CPU in the system. If bits CPU_CASE[6:4] contain the value 0b100, then that indicates a multiprocessor system configured with a P54C processor and a P54CM processor. If bits CPU_CASE[6:4] contain the value 0b001, then that indicates a multiprocessor system configured with two P54C processors without local APICs. Finally, if bits CPU_CASE[6:4] contain the value 0b011, then that indicates a multiprocessor system with two processors which include local APICs. The bit CPU_CASE[7] if set high indicates that the primary boot processor CPU1 is dead and that the computer system has been booted on the secondary CPU2.

As noted above, CPU1 is preferably designated as the processor that performs the power on functions. However, if CPU1 fails, the hot spare boot circuit 246 according to the present invention automatically switches to CPU2 to perform the power on functions. As also noted, on system power on reset, the signal PRESETIN is asserted by the PCI-EISA bridge 130. The signal PRESETIN initializes all PMIC registers, internal state machines, and the dead man counter 242 located in the hot spare boot circuit 246. On the next rising edge of the clock PCICLK, the PMIC 238 asserts the signals PRESETOUT[2:1] high. In the two primary processor configuration, the signal PRESETOUT[1] is provided as a hard reset to CPU1 and the signal PRESETOUT [2] is provided as a hard reset to CPU2. In the P54C/CM configuration, the signal PRESETOUT[1] is provided to the CMC 210, which in response asserts the signal PRESET to both CPU1 and CPU2.

While the reset signals PRESETOUT[2:1] are asserted high, the microprocessor 201 responds by driving certain of its output pins to predetermined states. If the microprocessor 201 is a P54CM processor, it drives its DPEN* pin low. The DPEN* pin is shared with the APIC data pin PICD[0]. In addition, in the two primary processor configuration, if the microprocessor 201A is the P54C processor with a local APIC, the pin APICEN is driven low by the CPU2 201A. The signal APICEN is shared with the APIC data pin PICD[1].

After the PCI-EISA bridge 130 negates the reset signal PRESETIN, the signals PRESETOUT[2:1] are negated on the next rising edge of PCICLK. Additionally, on the falling edge of the signal PRESETIN, the following signals are sampled by the PMIC 238: the signal DPEN, which when asserted low indicates that a P54CM is installed; the signal TWPRIM* which when asserted low indicates a multiprocessor system configured with two primary processors, with or without APICs; and the signal APICEN which when asserted high indicates that the APIC on CPU2 in the two primary processor configuration is enabled. If all the above signals are sampled in their deasserted states, then that indicates only one CPU is in the system and the hot spare boot capability is by default non-functional.

Referring now to FIGS. 3A–C, 4A–C and 5A–C, tables are shown illustrating the differences in the Systempro for specific registers necessary for emulation. It can be seen that numerous of the registers are treated identically, such as the capturing of I/O cycles to the 8259 interrupt controller by P2, the math coprocessor/cold boot register and so on. The P1 and P2 cache control ports in FIGS. 4A and 5A always read zero, as the features as indicated in FIG. 3A are not implemented and are not appropriate because of the change in basic system design, which does not include the NCA or noncacheable address RAM and does not utilize the lock modification as utilized in the Systempro. Therefore conversion to reading only zeros is appropriate. Certain changes have also been made to the P1 processor control port, particularly the operation of the FLUSH and CACHEON bits. As seen in FIG. 3B, in the Systempro the activation of the FLUSH bit causes the P1 caches to be flushed, while resetting the CACHEON bit disables the P1 caches. In the first emulation embodiment, the FLUSH bit causes flushing of the internal caches of both processors 200 and 201 and the L2 external cache, while setting the CACHEON bit and then toggling it off causes a flushing of both internal caches and the external cache. In the embodiment with two primary P54Cs as shown in FIG. 2A, the FLUSH bit is a read only bit and setting the CACHEON bit asserts the FLUSH signal to the P1 caches.

Proceeding then to the EISA Arbitration Inhibit register at address OC6B, this has been converted to the CPU Case Register because the feature has been dropped and is not critical to emulation. Therefore the CPU Case Register is provided at this address to save addresses and to provide necessary indications of CPU configuration. The WHO AM I register at address OC70 is unchanged, while the P2 cache control at port address FC67 is treated in a manner similar to the P1 cache control port, where the emulation environment is read only and provides only zero values.

In the Systempro the second processor would only be interrupted by a numeric coprocessor error or by the P1 processor, and if an interrupt acknowledge cycle was ever provided by P2, a trap vector was provided in special logic to provide a special vector to the P2 processor. This vector was contained at address FC68, with this address register being provided for continuity in the emulation mode, even though the vector is not utilized. In the preferred embodiments of FIGS. 2 and 2A, if P2 provides an interrupt acknowledge cycle, it is simply captured by the PMIC 238 and the interrupt acknowledge cycle is ignored as the local APIC will be responsible for providing whatever messages are appropriate in this case. If the P2 processor is one without an APIC, then effectively a reset is provided. Therefore the P2 interrupt vector port is provided but serves no function in the emulation environment.

The P2 processor control port at address FC6A is treated differently in the emulation environment as compared to the original Systempro environment. The FLUSH and CACHEON bits perform as described relating to the P1 processor control port. The SLEEP bit, which is bit 3, when set for a processor with an APIC, causes the processor to be reset and then disabled from executing by use of a INIT IPI without a corresponding startup IPI. If the processor is one without an APIC, then it simply disables the processor from executing. The RESET CPU bit zero is also treated differently. Writing that bit in the Systempro caused the processor to be reset. If the processor is a P54 without an APIC, then the PRESETOUT[2] pin is pulsed for 15 PCI CLK periods to allow resetting of the processor. In the case of any processor, such as the P54C or P54CM, then writes to this register are ignored, as resetting is developed using the SLEEP bit 3.

Figure 7:
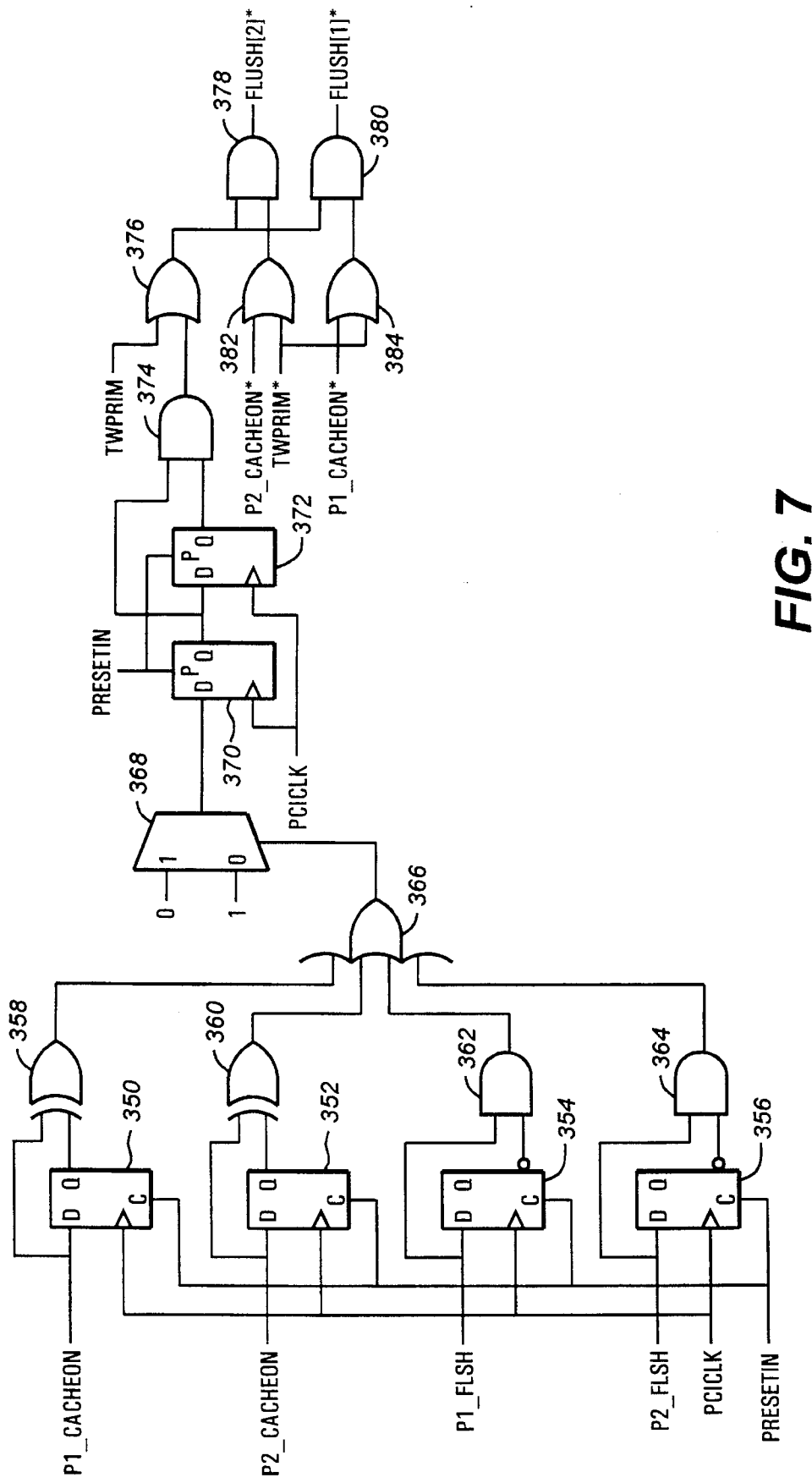
Figure 8:
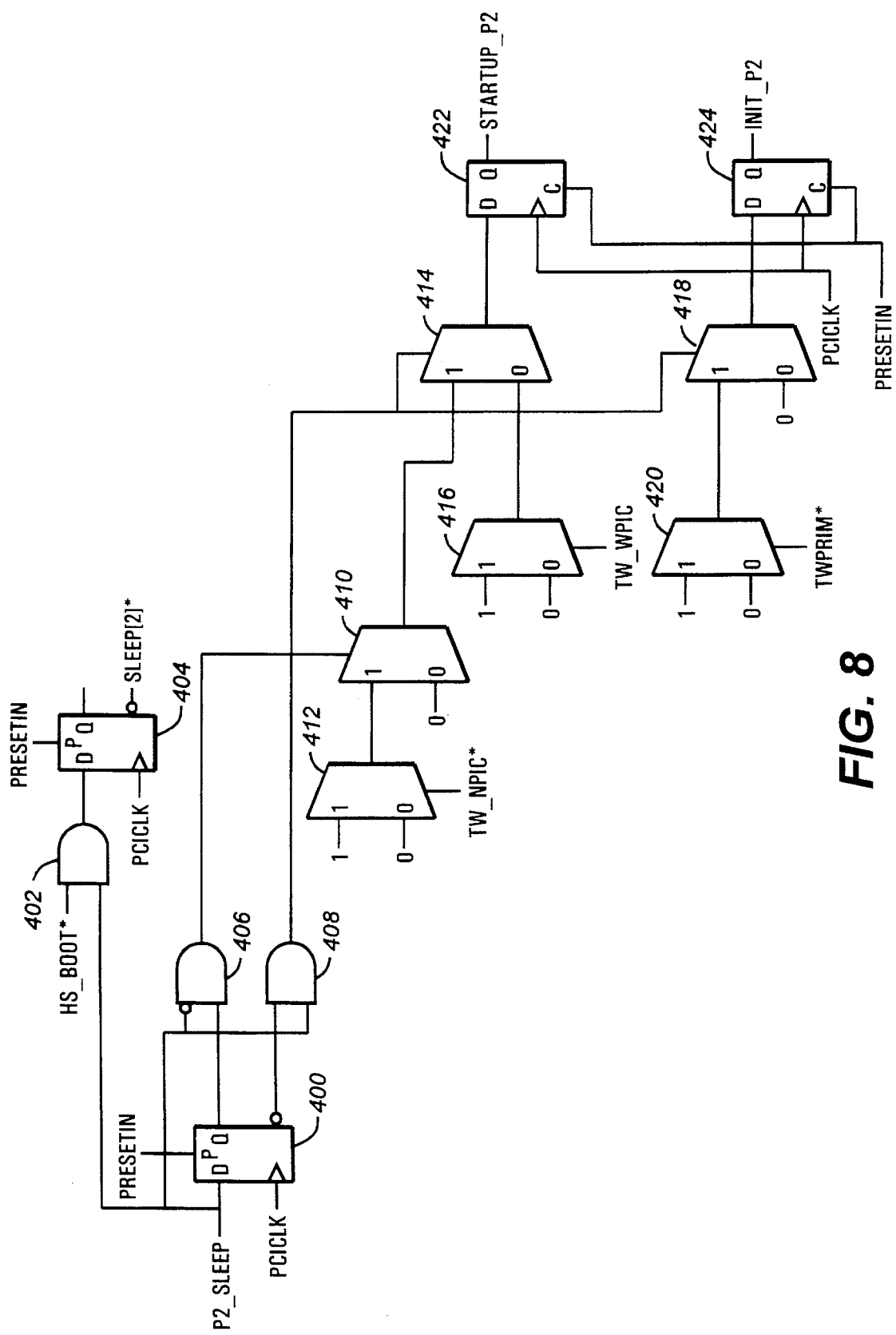

Therefore the primary changes relate to the FLUSH, SLEEP, CACHEON bits and resetting of the CPU, particularly CPU2. Details of the logic used in the emulation logic 246 are shown in FIGS. 6, 7 and 8.

Figure 6:
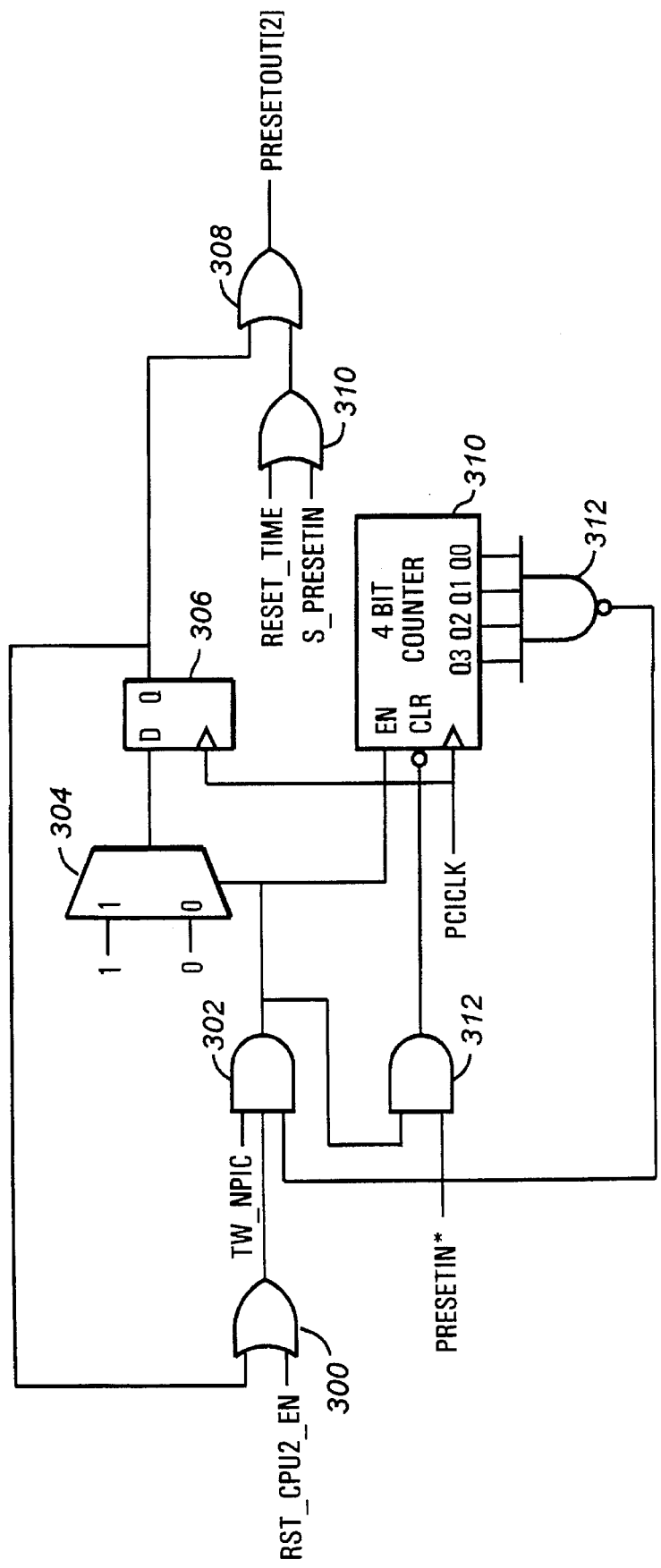
FIGS. 6, 7 and 8 are schematic diagrams of circuitry for performing the Systempro emulations according to the present invention.

Development of the PRESETOUT[2] signal is shown in FIG. 6. The RST_CPU2_EN signal, which is bit 0 in the P2 processor control port, is provided as one input to a two input OR gate 300. The output of the OR gate 300 is provided as one input to a three input AND gate 302. The second input to the AND gate 302 is a signal referred to as TW_NPIC which is indicative of a twin primary processor system with no APICS. This will be indicated for example by a CPU case register value of 001. The output of the AND gate 302 is provided to the select input of a two input multiplexer 304. The one input of the multiplexer 304 receives a logical one signal, while the zero input of the multiplexer 304 receives a logical 0 signal. The output of the multiplexer 304 is provided to the D input of a D type flip-flop 306, which is clocked with the PCICLK signal. The noninverting output of the flip-flop 306 is provided as the second input to the OR gate 300 and to one input of an OR gate 308. The output of the OR gate 308 is the PRESETOUT [2] signal.

The output of the AND gate 302 is further provided to the enable input of a four bit counter 310. The inverted clear input of the counter 310 is connected to the output of a two input AND gate 312 which receives at its inputs the output of the AND gate 302 and the PRESETIN* signal, which indicates when asserted low that the PRESETIN signal is being asserted to request a reset. The counter 310 is clocked with the PCICLK signal. The four output bits of the counter 310 are provided as the four inputs to a NAND gate 312, whose output is connected as the final input to the AND gate 302. Thus, when the RESET_CPU2_EN signal is set and the processor configuration is the dual primary processors without APICs, then the counter 310 is enabled and a high value is provided to the OR gate 308 for a period of 15 PCICLK periods. This allows proper time for resetting the processor.

The second input to the OR gate 308 is provided by the output of an OR gate 310 whose inputs are the RESET_TIME signal and the S_PRESETIN signal. The S_PRESETIN signal is a synchronized version of the PRESETIN signal, while the RESET_TIME signal is a signal to indicate that a hot spare boot operation to switch from CPU1 to CPU2 is occurring. Details of this process are not relevant to this specification but are provided in an application entitled "CIRCUIT FOR REASSIGNING THE POWER-ON PROCESSOR IN A MULTIPROCESSING SYSTEM," and filed concurrently herewith, which is hereby incorporated by reference. Thus the PRESETOUT[2] signal is provided as required, since it is pulsed for processors without APICs and in other cases follows the RESETIN signal or is used for hot spare boot purposes.

Referring now to FIG. 7, the development of the FLUSH [2:1]* signals are illustrated. Four flip-flops 350, 352, 354 and 356 receive, respectively, P1_CACHEON, P2_CACHEON, P1_FLSH and P2_FLSH signals from the P1 and P2 processor control ports. It is noted that as in the case of the RESET CPU signal, that the actual development of the register or control port is not illustrated, the development being readily apparent to one skilled in the art and omitted for simplicity. The flip-flops 350, 352, 354 and 356 are clocked with the PCICLK signal and are cleared by the PRESETIN signal. The P1_CACHEON signal is provided as one input to a two input XOR gate 358 whose second input is the noninverted output of the flip-flop 350. Similarly, the P2_CACHEON signal is provided as one input to a two input XOR gate 360 whose second input is provided by the noninverted output of the flip-flop 352. The P1_FLSH signal is provided as one input to a two input AND gate 362 whose second input is connected to the inverting output of the flip-flop 354. Similarly, the P2_FLSH signal is provided as one input to a two input AND gate 364 whose second input receives the inverting output of the flip-flop 356. The output of the XOR gates 358 and 360 and the AND gates 362 and 364 are provided as the four inputs to an OR gate 366.

The output of the OR gate 366 is provided as the select input to a 2:1 multiplexer 368 whose one input is connected to a zero logic level and whose zero input is connected to a one logic level. The output of the multiplexer 368 is provided to the D input of a flip-flop 370. The noninverting output of the flip-flip 370 is connected to the D input of a flip-flop 372. The preset inputs of the flip-flops 370, 372 are connected to the PRESETIN signal and the PCICLK signal clocks the flip-flops 370, 372. The noninverting outputs of the flip-flops 370, 372 are the inputs to an AND gate 374, whose output is connected as one input to an OR gate 376. The second input to the OR gate 376 is the TWPRIM signal, which indicates when asserted that the two primary processor case of FIG. 2A is present. The output of the OR gate 376 is provided as one input to two AND gates 378 and 380. The second input to the AND gate 378 is provided by the output of the two input OR gate 382 which receives the P2_CACHEON* and TWPRIM* signals. The second input to the AND gate 380 is provided by an output of a two input OR gate 384 which receives as its inputs the P1_CACHEON, and TWPRIM* signals. The outputs of the AND gate 378 and 380 are the FLUSH[2]* and FLUSH[1]* signals respectively.

Therefore in the two primary processor case the two CACHEON signals effectively control the FLUSH signals through the action of the OR gate 376 and the OR gates 382 and 384. If the caches are activated in the two primary processor case, setting a FLUSH bit provides a simple pulse to the appropriate FLUSH outputs, which in turn causes the particular caches to be flushed. In the case of the processors as shown in FIG. 2, writing a one to the FLUSH bits causes a toggling of the FLUSH outputs, while toggling the CACHEON bit, as indicated by the presence of the XOR gates 358 and 360, similarly causes a pulsing of the FLUSH output signals to cause flushing in the caches.

Referring to FIG. 8, the development of the SLEEP[2]* signal and indications to provide the startup and INIT IPIs is shown. The P2_SLEEP signal is provided to the D input of a flip-flop 400. P2_SLEEP signal is bit 3 of the P2 processor control port. This bit is also provided as one input to a two input AND gate 402, with the second input receiving a signal referred to as HS_BOOT* or not hot spare booting. The signal indicates that a hot spare boot is not in progress, during which operation it would not be appropriate to put the second processor to sleep. The output of the AND gate 402 is provided to the input of a flip-flop 404 which is preset by the PRESETIN signal and clocked with the PCICLK signal. The inverting output of the flip-flop 404 is the SLEEP[2]* signal which is provided to CPU2 201A in the non-APIC case to allow it to be put to sleep. The SLEEP[2]* signal is not connected in any of the other cases.

The noninverting output of the flip-flop 400 is provided as one input to an AND gate 406. The flip-flop 400 is preset by the PRESETIN signal and clocked by the PCICLK signal. The second input to the AND gate 406 is inverted and receives the P2_SLEEP signal. The inverting output of the flip-flop 400 is provided as one input to an OR gate 408, with the second input being the P2_SLEEP signal. The output of the AND gate 406 is provided as the select input to a multiplexer 410 which receives at its zero input a logical zero level. The one input of the multiplexer 410 is connected to the output of a two input multiplexer 412 which receives as its one input a logical one level and at its zero input a logical zero input. Selection of the multiplexer 412 is done by the TW_NPIC* signal. The TW_NPIC* signal is asserted as the inverse of the TW_NPIC signal, which when asserted, indicates that this is the twin primary processor without APIC case as indicated by the CPU case register setting of 001. The output of the multiplexer 410 is provided to the one input of a two input multiplexer 414. The zero input of the multiplexer 414 is provided by the output of a two input multiplexer 416 which receives as its one input a one logical level and at its zero input a zero logical level. The multiplexer 416 is selected with a TW_WPIC signal, which indicates that this is the twin primary processor with APIC or 011 case. The multiplexer 414 is selected by the output of the AND gate 408.

The output of the AND gate 408 provided to the select input of a two input multiplexer 418 whose zero input receives a logical zero level. A one input to the multiplexer 418 is provided by the output of the two input multiplexer 420 whose one input receives a logical one level and whose zero input receives a logical zero level. Selection of the multiplexer 20 is provided by the TWPRIM* signal.

The output of the multiplexer 414 is provided to the D input of a flip-flop 422, while the output of the multiplexer 418 is provided to the D input of a flip-flop 424. The flip-flops 422 and 424 are cleared by the PRESETIN signal and clocked with the PCICLK signal. The output of the flip-flop 422 is the STARTUP_P2 signal, while the output of the flip-flop 424 is the INIT_P2 signal. The STARTUP_P2 and INIT_P2 signals are provided to the I/O APIC 244 in the PMIC 238. Therefore in the case of the processor 2 of FIG. 2, setting the P2_SLEEP bit causes an INIT IPI to be sent to P2, which causes the processor to be reset but then stall waiting for the STARTUP IPI. When the SLEEP bit is reset, the STARTUP IPI is transmitted to P2 to start it up and proceed to the STARTUP vector which is directed to a given location.

In the case of the twin primary processor with APIC case, the STARTUP IPI is provided both on setting and resetting the RESET bit. The BIOS ROM then reads the processor control port to determine if the SLEEP bit is set and if so, this is an indication that this is a sleep operation. Therefore, the BIOS stops execution. If the SLEEP bit is set to zero, then this is an indication that this is an awakening call and execution will commence. In the case of twin primary processors without APICs, the SLEEP[2]* signal is connected and it functions effectively identically to the Systempro.

Therefore, the use of these three particular circuits to emulate the three functions which need to be changed because of the changes in processors allows Systempro emulation in a symmetric multiprocessor case, particularly one using P54C processors, thus allowing use of large amounts of interesting software.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system allowing a symmetric multiprocessor computer system to emulate an asymmetric Systempro multiprocessor computer system, the computer system comprising:

a symmetric multiprocessor computer system, said computer system including first and second microprocessors having internal cache systems and advanced programmable interrupt controllers adapted for multiprocessor operation and including an external cache system;

means for providing emulation registers at the same locations as the multiprocessor specific registers in the Systempro computer system; and means for adapting specific identical bits in said emulation registers to perform compatible operations to said first and second microprocessors.

2. The computer system of claim 1, wherein the Systempro specific registers include processor control ports for each processor and each said processor control port includes cache flush and cache enable bits operable for each processor independently; and wherein said means for adapting flushes the internal cache systems of both of said first and second microprocessors and said external cache system when one of said cache flush bits is set or when one of said cache enable bits is toggled.

3. The computer system of claim 1, wherein the Systempro specific registers include a processor control port for said second microprocessor, said processor control port including a SLEEP bit to disable operation of the microprocessor and a RESET bit to reset the microprocessor; and wherein said means for adapting resets said second microprocessor and disables operations of said microprocessor when said SLEEP bit is set and ignores said RESET bit.

4. The computer system of claim 3, wherein said means for adapting performs said reset and disable operations by transmitting a initialize interprocessor operation to said second microprocessor advanced programmable interrupt controller without providing a startup interprocessor operation to said second microprocessor advanced programmable interrupt controller.

\* \* \* \* \*